United States Patent [19]

Berwick et al.

[11] Patent Number: 4,504,871
[45] Date of Patent: Mar. 12, 1985

[54] MAGNETIC MEDIA TEST FIXTURE APPARATUS

[75] Inventors: James D. Berwick, Sunnyvale; Kyle T. Lam, Fremont, both of Calif.

[73] Assignee: Verbatim Corporation, Sunnyvale, Calif.

[21] Appl. No.: 342,124

[22] Filed: Jan. 25, 1982

Related U.S. Application Data

[63] Continuation of Ser. No. 110,539, Jan. 8, 1980, abandoned.

[51] Int. Cl.³ .................. G11B 27/36; G01R 33/12
[52] U.S. Cl. .................. 360/31; 324/210; 360/137
[58] Field of Search .............. 360/31, 135, 137; 324/210, 212

[56] References Cited

U.S. PATENT DOCUMENTS

| | | | |
|---|---|---|---|
| 3,511,151 | 5/1970 | Hillman | 360/31 X |
| 3,678,219 | 7/1972 | Dennis | 360/135 X |
| 3,678,481 | 7/1972 | Dalziel et al. | 360/106 X |
| 3,700,826 | 10/1972 | O'Neal | 360/137 |
| 3,710,235 | 1/1973 | Barrager et al. | 324/210 |
| 3,962,724 | 6/1976 | Koizumi | 360/31 |
| 4,142,215 | 2/1979 | Roberts | 360/31 |

OTHER PUBLICATIONS

New Test Tape for Magnetic Recorders; Konnis, Tele-Tech & Electronic Industries, Apr. 1954, pp. 88-89.
Automated Multiple Head Disk Testing Machine; Fletcher et al., IBM Disclosure Bulletin, vol. 22, No. 3, Aug. 1979.
Read/Write Head Test; Buckthal, IBM Technical Disclosure Bulletin, vol. 17, No. 1, p. 39, Jun. 1974.
Cartridge for Testing Magnetic Recording Disks, Fletcher and Whitted, IBM Technical Disclosure Bulletin, vol. 22, No. 3.
Test Disk and Process for Checking Magnetic Heads; Holloway, IBM Technical Disclosure Bulletin, vol. 21, No. 9, Feb. 1979.
Measurement of Frequency Response of Magnetic Transducers; Shidler, IBM Technical Disclosure Bulletin, vol. 18, No. 9, Feb. 1976.

Primary Examiner—Aristotelis M. Psitos
Attorney, Agent, or Firm—Thomas E. Schatzel

[57] ABSTRACT

A test fixture apparatus for testing drives of magnetic recording media; the apparatus being adapted to simulate magnetic media for insertion within a magnetic recording drive. The test fixture apparatus includes a structure formed with exterior dimensions approximating those of the magnetic media; one or more conductors positioned to be in close proximity to the gap or gaps of the magnetic recording head within the drive when the test fixture apparatus is inserted; signal detection and driver circuitry to drive the conductor or conductors in order to simulate readback flux reversals and to check write characteristics of the drive; and means to simulate index pulses for flexible disk applications. A magnetic data cartridge application is also included as an alternative embodiment.

7 Claims, 6 Drawing Figures

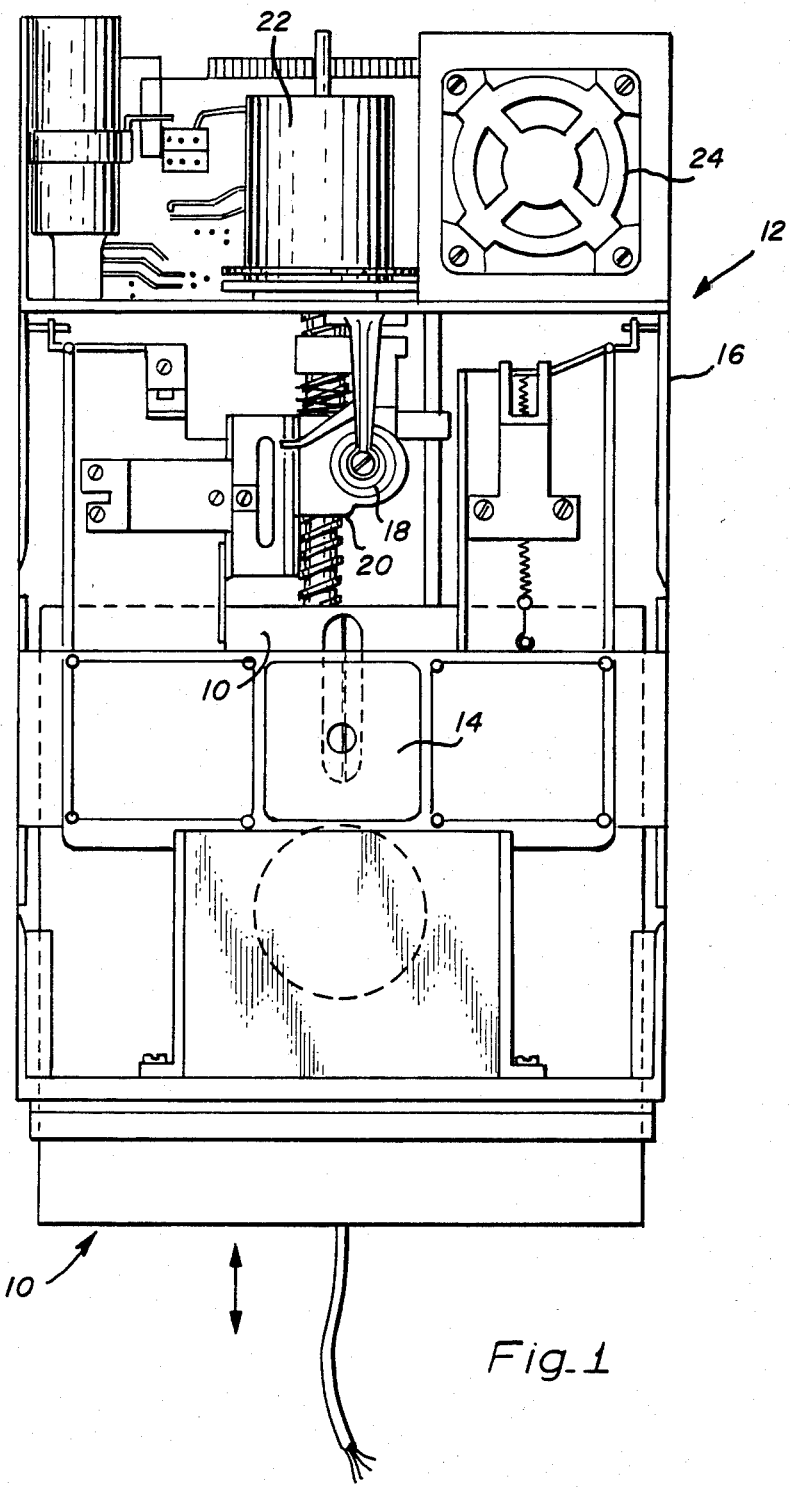
Fig_1
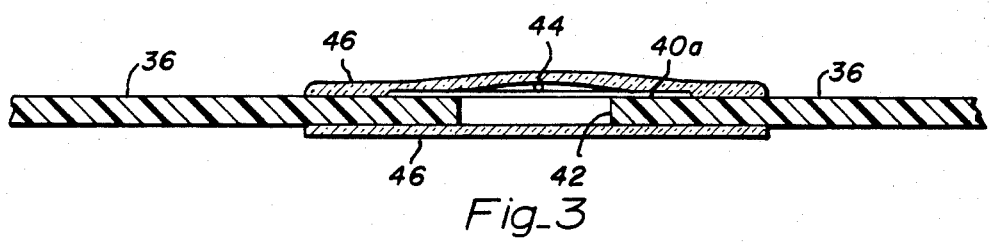
Fig_3

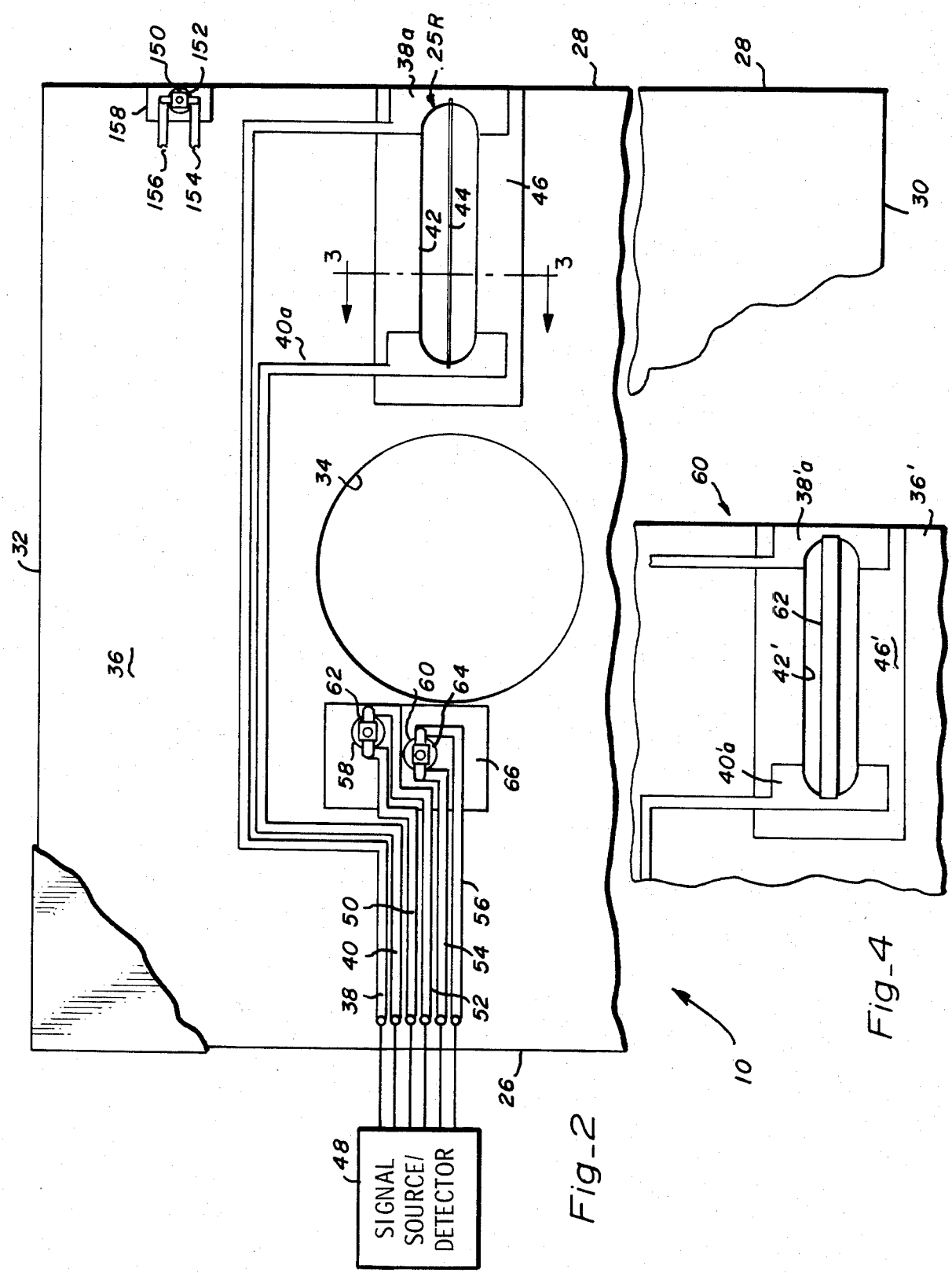

MAGNETIC MEDIA TEST FIXTURE APPARATUS

This is a continuation of application Ser. No. 110,539, filed Jan. 8, 1980 and now abandoned.

BACKGROUND OF THE INVENTION

1. Field of the Invention

The invention relates to the field of magnetic recording and to apparatus for testing and adjusting magnetic recording devices. The invention finds particular application in the field of digital magnetic recording as practiced upon flexible disks, data cartridges, and the like.

2. Description of the Prior Art

Within the magnetic recording technology, the art can be conceptually viewed in two broad categories: (1) the magnetic recording media, and (2) the apparatus adapted to receive the magnetic recording media in order to record information thereon and/or extract information therefrom (i.e. the drive). The manufacture of magnetic recording media is an extremely delicate and subtle process which yields a family of devices among which are flexible disks, tapes, tape cassettes, data recording cartridges, and others. These magnetic media devices and/or implementations are adapted to be received by suitably designed drives. In addition, the manufacture and design of magnetic recording drives is a demanding technical achievement. Universally, the way that magnetic recording media and magnetic recording drives are tested is by operating each within a proper operating environment, i.e., placing the media to be tested within a "standard" drive or placing a "standard" media device within a drive to be tested.

Both the testing of drives using "standard" media and the testing of media using "standard" drives are frought with difficulties. First, the actual error rate of a magnetic recording device when reading and writing is a complex function of many variables including the media/drive interface. Head/media separation bears an exponential relationship to read back amplitude, and, thus, variations in head/media separation have geometric effect upon error rate. Second, media which might be considered "standard" today tends to degrade in time because most media is sensitive to variations in temperature, humidity, handling, etc. Thus, it is desirable to have an apparatus and/or technique for separating the performance of the drive from the actual performance of the media so that magnetic recording drives can be checked and/or measured from known and verifiable standards which are unchanging.

Attempts have been made to decouple media effects from drive effects in magnetic recording. For example, attempts have been made to couple a signal into a magnetic recording drive after the read/write recording head. Though this technique is successful, it cannot be used to evaluate the performance of the head itself because the signals are coupled after the head into the read/write train. Also, this technique is cumbersome and difficult to use because in typical magnetic recording drives, access to the read/write recording head is not readily available. At the present time, no viable technique exists for test and adjustment of magnetic recording drives other than utilizing standard media for this purpose.

SUMMARY OF THE INVENTION

It is thus an object of the present invention to provide an apparatus whereby a magnetic recording drive may be rapidly, simply and conveniently checked for its recording performance and adjustments made thereto if necessary without insertion of magnetic recording media.

It is another object to provide an apparatus for the test, adjustment, and measurement of magnetic recording drives which is economical in cost, unchanging over time, and simple to verify in accuracy.

It is yet another object to provide a device for the measurement, checking, and adjustment of magnetic recording drives which is both portable and simple to operate.

It is yet another object to provide an apparatus for the test, measurement, and adjustment of magnetic recording drive devices where such devices are flexible disk drives and magnetic data cartridge devices.

It is yet another object of the present invention to provide an apparatus for measurement, test, and adjustment of magnetic recording drive devices where the test apparatus is sufficient to check-out all media induced signals within the magnetic recording drive.

The present invention is directed toward an apparatus to provide a simple, efficient, and reliable tool for the test, measurement, and adjustment of a magnetic recording drive device. In a preferred embodiment for use with a flexible disk drive, a structure constructed from a nonmagnetic, nonconductive material in the generalized shape of a magnetic recording disk is adapted for receipt within the receiving slot of a magnetic recording flexible disk drive. The test apparatus presents a conductor which crosses the magnetic recording gap of the read/write head of the magnetic recording drive. By suitably exciting the conductor from a signal source, the amplitude and frequency of signals which the magnetic recording head would sense during a magnetic recording operation is effectively induced therein. As signal generators can be made extremely accurate and their output measured, the signal inductively coupled into the magnetic recording head is very predictable and reliable. In this manner, the entire drive read/write recording channel from the magnetic recording head through analog amplifiers and digitizers can be checked for amplitude, resolution, detection of drop-outs, wave form modulation, missing bit and extra bit detection, etc.

In addition, by including within the signal source circuitry analogous to a read channel, the present invention includes the capability of measurement and/or adjustment of the write characteristics of the magnetic recording drive under test.

In addition to the inductive coupling of a signal into the magnetic recording head, many rotating magnetic flexible disk drives require an index signal or signals which are used to determine sector locations. The apparatus of the present invention includes suitable light sources adapted to excite the light sensitive elements within the magnetic recording flexible disk drive to thereby induce the proper sector pulses. In addition, by a similar technique, it is possible to check and test the write protect circuitry which in some flexible disk drives utilizes a separate light receptor.

The apparatus of the present invention is also directed in an alternative embodiment to testing magnetic data cartridges of a standard variety using similar techniques.

It is thus an advantage of the present invention to provide a test fixture for the testing, adjustment, and measurement of a magnetic recording flexible disk drive which is inexpensive to manufacture, simple to operate, and easily verifiable.

It is another advantage of the present invention to provide a test apparatus which has the potential for greater testing and measurement capacity by building into the excitation source used for coupling a signal into the magnetic recording head a certain degree of intelligence that can induce specific data wave forms and test patterns.

These and other objects and advantages of the present invention will no doubt be apparant to those skilled in the art by referring to the following detailed description of a preferred embodiment and by reference to the several drawing figures.

BRIEF DESCRIPTION OF THE DRAWINGS

FIG. 1 is a perspective view of the test fixture apparatus of the present invention illustrated as being inserted into a flexible disk drive device;

FIG. 2 is a plan view of the test fixture apparatus of FIG. 1;

FIG. 3 is a view taken along line 3—3 of FIG. 2;

FIG. 4 is a plan view of an alternate embodiment of a test fixture apparatus of the present invention with the conductor located near the magnetic gap of a read/-write recording head;

DESCRIPTION OF THE PREFERRED EMBODIMENT

Figure 5:
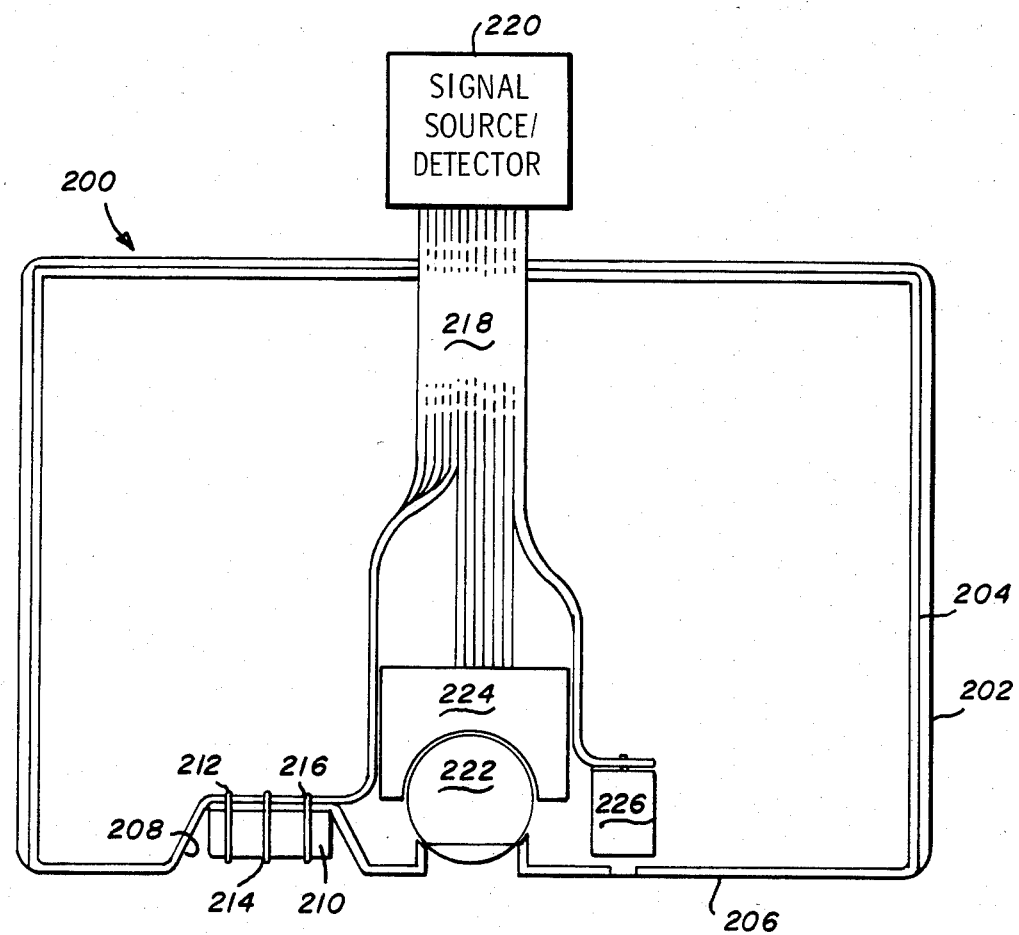
FIG. 5 is a plan view of an alternate embodiment of a test fixutre apparatus of the present invention adapted for use with a data cartridge drive.

A preferred embodiment of a test fixture according to the present invention and generally referred to by the reference character 10, is shown in FIG. 1 as applied to a flexible disk drive. The test fixture 10 is illustrated as partially inserted into a flexible disk drive 12 adapted to matingly receive the properly dimensioned test fixture 10. A receiver apparatus 14 attached to a frame 16 of flexible disk drive 12 provides a guided path for the test fixture 10 during insertion into flexible disk drive 12. A magnetic recording head 18 is affixed to a carriage 20 to provide radial motion of said magnetic recording head 18 upon urging by a stepping motor 22. A spindle motor 24 provides through a belt (not shown) the torque required to rotate a flexible magnetic disk when inserted within flexible disk drive 12.

FIG. 2 is a plan view of the test fixture 10. The test fixture 10 is generally shaped so that it may be inserted into a flexible disk drive unit. For example, if it is to test a flexible disk drive, the apparatus 10 is configured to be compatible with a flexible disk drive. A flexible disk generally comprises magnetic media in the shape of a circular disk of tape-like material with iron-oxide particles suspended in a flexible binder adhering to a mylar backing, the magnetic media being contained within a rectangular-shaped plastic jacket. Thus, the external dimensions of the apparatus 10 are such that it will fit within a housing illustrated in the form of a the plastic jacket of a flexible disk. The apparatus 10 has a pair of parallel edges 26 and 28 and a pair of parallel edges 30 and 32. The distance between the edge 26 and the edge 28 and the distance between the edge 30 and the edge 32 are such that the test fixture 10 has width and length dimensions so that it can be readily slid within a jacket. The thickness of testing apparatus 10 is also adapted to be compatible with the thickness dimension of said plastic flexible disk jacket. In addition to corresponding to the external edge dimensions of said flexible disk jacket, testing fixture 10 also includes a hole 34. The hole 34 is adapted to permit the spindle locking mechanism of the flexible disk drive 12 to function in a normal manner when the apparatus 10 is inserted within the drive 12.

The structure of the testing fixture 10 may be constructed from a nonconducting, nonmagnetic material. It has been found convenient to construct said test fixture 10 from a planar board 36 of commonly available glass epoxy circuit board material. The board 36 carries a plurality of conductive traces. A conductive trace 38 and a conductive trace 40 extend from edge 26 and around hole 34 to form a conductive land 38a and a conductive land 40a about an oblong-shaped opening 42 in circuit board 36. The opening 42 has dimensions approximately equivalent to those of a similar opening within the plastic flexible disk jacket that testing fixture 10 is designed to fit within. Opening 42 is formed into the shape of a slot in which the lengthwise dimension approximates the extent of radial motion of the magnetic recording head 18 in the flexible disk drive 12 when said magnetic recording head 18 accesses the plurality of magnetic recording tracks upon a magnetic recording disk inserted within said drive 12. Generally spanning the longitudinal dimension of opening 42 and electrically connected to lands 38a and 40a is a conductor 44. Conductor 44 is positioned so that it is located approximately within the magnetic recording gap of the magnetic recording head 18 of the flexible disk drive 12 when test fixture 10 is inserted within said drive 12. In a working model constructed according to the present invention, conductor 44 is formed from thirty gauge bare, tinned, copper wire.

Adhesively attached to both sides of circuit board 36 and sandwiching the wire 44 therebetween are a pair of clear mylar patches 46 as shown in FIG. 2. Patches 46 are utilized to avoid damage to the magnetic recording head 18 located within the flexible disk drive 12 when the magnetic recording head 18 contacts the clear mylar patches 46 which sandwich conductor 44 therebetween.

Referring to FIG. 3, which is a cross-sectional view along line 3—3 of FIG. 2, note that circuit board 36 is sandwiched between mylar patches 46, one mylar patch 46 disposed on each side of circuit board 36. In addition, conductive land 40a is visible in FIG. 3, and conductor 44 is attached thereto. Conductor 44 is relatively immobile since it is rigidly attached at lands 40a and 38a. However, since conductor 44 is of relatively small cross-section, it will slightly penetrate into opening 42 during operation described in greater detail hereafter.

Conductors 38 and 40 are connected at edge 26 to a signal source and detector network 48 which is adapted to provide high frequency excitation to the conductor 44. The excitation which would be utilized commonly to test flexible disk drives would be the so-called 1F and 2F recording frequencies. In a typical, commercially available flexible disk drive, said 1F and 2F frequencies correspond to 125 kilohertz and 250 kilohertz, respectively. In addition, signal source and detector 48 also includes a "read channel" in order to measure the "write" performance of flexible disk drive 12 under test.

Test fixutre 10 also includes four additional conductive traces 50, 52, 54, and 56. Traces 50 and 52 extend to an opening 58, and traces 54 and 56 extend to an opening 60 within board 36 as shown in FIG. 2. Electrically attached to conductors 50 and 52 and positioned over opening 58 is a strobing light source 62. Similarly, electrically attached to conductors 54 and 56 and positioned over opening 60 is a strobing light source 64. Covering both openings 58 and 60 and light sources 62 and 64, respectively, is a light shield 66. Light shield 66 is attached to the board 36 upon one side only positioned as shown in FIG. 2. Openings 58 and 60 within circuit board 36 are positioned so that light sources 62 and 64, respectively, will illuminate light receptive elements (not shown) within the flexible disk drive. The light shield 66 blocks out light from the drive's own light source for test purposes. In an operational model constructed in accordance with the present invention, light sources 58 and 60 have each utilized an infrared LED such as a TLI-41 or a Monsanto ME-60. In addition, light shield 66 may be constructed from any opaque material, e.g. black paper has been utilized successfully for this purpose. Operation and excitation of light sources 58 and 60 will be described in greater detail hereafter.

In order to utilize the test fixture 10 as described above, it is slid within a suitable plastic jacket. This jacket is then inserted into a flexible disk drive 12 so adapted to matingly receive a flexible disk within its jacket. In order to operate the flexible disk drive 12 with test fixture 10 inserted therewithin, most flexible disk drives 12 require an index signal input which indicates the rotational position of the rotating magnetic media as well as proper rotational speed. The index signal is generated when a hole in a rotating flexible disk passes over the drive's light source causing the light receptive elements within the disk drive to be illuminated. Since the test fixture 10 does not rotate, these signals are artifically supplied by strobing light sources 62 and 64 to simulate a disk rotating at the proper speed. Drivers for the strobing light sources 62 and 64 are included within signal source detector 48. Once a pulse of light is provided to the flexible disk drive 12 at the proper intervals, the flexible disk drive 12 circuitry will permit "loading" of the read/write recording head 18. Once the read/write recording head is "loaded" or contacts patches 46, a signal corresponding to the 1F and/or 2F frequencies of magnetic recording can be induced into conductor 44 through conductors 40 and 38. In this manner, the flexible disk drive 12 can be checked, measured, and/or adjusted for certain threshold readback amplitudes, resolution, and other signal parameters. Moreover, it is clearly within the concept of the present invention to alter the simple triggered sine wave signal source at the 1F and/or 2F frequencies and exchange such signal source for specific data patterns and/or signal envelopes which simulate extra bits, missing bits, data streams, etc. With the use of a more sophisticated signal source and detector 48 constructed from known technologies and components, test fixture 10 has the capability for totally checking out the readback characteristics of magnetic recording flexible disk drives and making adjustments thereto. As previously mentioned, "write" characteristics of the drive may also be checked by including a "read" channel within signal source and detector 48.

There are alternative embodiments for producing a low cost, high volume, and practical application of the present invention. For example, FIG. 4 illustrates a section of an alternative embodiment referred to by the general reference character 60. The apparatus 60, in order to eliminate alignment difficulties of conductor 44 with respect to edges 26, 28, 30 and 32, comprises a conductor 62 constructed from a conductive planar or ribbon material. Elements of FIG. 4 similar to those shown in FIG. 2 are designated in FIG. 4 by the same reference numerals distinguished by a prime notation. FIG. 4 is similar to FIG. 2 except to the extent that conductor 44 of circular cross-section has been replaced with the thin ribbon conductor 62. In this manner, alignment of conductor 62 with the gap of read/write recording head of the drive is assured.

An embodiment may be such that instead of constructing test fixture 10 from a board 36 of printed circuit board material, it may be constructed from flexible mylar material of the type from which flat cables are commonly manufactured. Such flat cables have a thickness of approximately 5 to 7 mils (0.005 to 0.007 inches) with all necessary conductors included within and terminated by an edge connector for suitable connection to signal source and detector 48 as discussed above.

Another embodiment may be designed to take into consideration that it is frequently desirable to checkout the "write protect" circuitry within the rotating magnetic flexible disk drive 12. The write protect circuitry generally in flexible disk drives is actuated by exposing a light receptor within the flexible disk drive to a light source. When the light receptor is activated by the source, the disk drive is prevented from writing upon the magnetic media. As illustrated in FIG. 2, this circuitry may be checked and/or adjusted by inclusion of an additional light source 150 attached to the board 36 within an opening 152. Light source 150 is connected to a pair of conductors 154 and 156 supplying excitation to said light source 150. As with the light sources 62 and 64, light source 150 is positioned on the board 36 so that when light source 150 is energized, light therefrom will fall upon the appropriate light receptor within the flexible disk drive 12 when test fixture 10 is inserted therewithin. Similar to light shield 66, a light shield 158 covers light source 150 so that the light source resident within the disk drive 12 will not illuminate the light receptor within the disk drive 12. In this manner, the only light source which can illuminate the light receptor within the disk drive 12 is light source 150.

The embodiments described above are directed toward application of the present invention to rotating magnetic disk drives which tend to utilize standard geometry, flexible disks contained in plastic jackets. The concept of the present invention, however, can be applied to other magnetic recording devices. For example, the concepts and structures as described hereinabove been applied to a standard geometry (ANSI X3.55-1977) ¼″ data recording cartridge. Such an application is shown in FIGS. 5 and 6.

FIG. 5 is a top plan view of a data cartridge test fixture shown generally by the reference numeral 200. Data cartridge test fixture 200 includes a bottom plate 202, a top cover 204 and a front face 206. The bottom plate 202 and top cover 204 in combination generally form a structure with dimensions comparable to a standard data cartridge so that data cartridge test fixture 200 may be matingly received by a suitable data cartridge drive (not shown).

Figure 6:
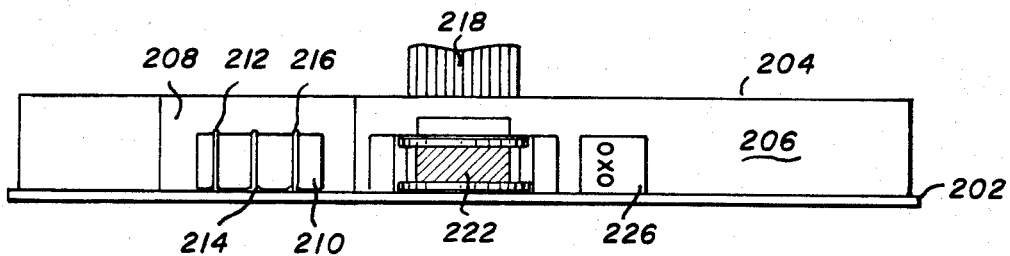
FIG. 6 is an end view of FIG. 5.

FIG. 6 illustrates a frontal view of the data cartridge test fixture 200. Front face 206 is the plane of data cartridge test fixture 200 which is adapted to mate with the magnetic recording head within the data cartridge drive (not shown), drive capstan within the data cartridge drive (not shown), and end-of-tape/beginning-of-tape (EOT/BOT) sensors within the data cartridge drive (not shown).

Located along front face 206 is a cut-out 208 similar to that which exists in a standard data cartridge of the prior art. Located within cut-out 208 is a resilient block 210 rigidly affixed to the bottom plate 202. A conductor 212, conductor 214, and a conductor 216 are wrapped about resilient block 210 and insulated from the bottom plate 202 and from each other. Conductors 212, 214, and 216 are connected to a multiconductor cable harness 218 which is connected to a signal source and detector network 220. Operation of conductors 212, 214, and 216 in conjunction with signal source and detector 220 will be described in detail hereafter.

Also located along front face 206 is a driven hub 222. When data cartridge test fixture 200 is inserted within a suitably adapted data cartridge tape drive, driven hub 222 contacts a driving capstan of the drive. Driven hub 222 is thereby caused to rotate similar to that of a driven hub in a standard data cartridge. In a standard data cartridge the rotation of the driven hub causes the magnetic tape media to move from a supply hub to a take-up hub. The speed of rotation of driven hub 222 is critical to data cartridge drive performance. Therefore, the data cartridge test fixture 200 includes a tachometer and direction sensor 224 positioned adjacent to driven hub 222. Tachometer and direction sensor 224 may be of the magnetically coupled, Hall effect type or could be an optically coupled device. In either case, technologies are well known in the art to detect the speed and direction of rotation of the driven hub 222. Tachometer and direction sensor 224 is also connected electrically to the multiconductor cable 218 which ultimately connects to the signal source and detector 220. Data cartridge test fixture 200 also includes a light source 226 positioned along the front face 206 so that light sensitive receptor elements within the data cartridge drive may be stimulated to test for proper EOT/BOT detection.

In operation, to test a data cartridge drive, the test fixture 200 is inserted within the data cartridge drive in the same manner that a data cartridge would be inserted. Typically, upon insertion of a data cartridge the drive first searches for BOT by suitably moving the magnetic media to the supply hub. With test fixture 200, this is simulated by suitably illuminating light source 226. Thereafter, the drive will attempt to perform the required reading or writing. With the test fixture 200, the rotational speed of driven hub 222 may be checked and/or adjusted with respect to read/write performance. Moreover, conductor 212 is adapted for erase head sensing; conductor 214 is adapted for write head sensing; and conductor 212 is adapted for read head sensing. That is, each of said conductors 212, 214, and 216 is positioned so that when the fixture 200 with resilient block 210 carrying said conductors 212, 214, and 216 is inserted within the data cartridge drive, each of said conductors 212, 214, and 216 will be adjacent to the erase, write, and read gaps of the magnetic recording head positioned in the drive. Conductors 212, 214, and 216 are of relatively small cross-section, and ribbon conductors may in fact be utilized to eliminate conductor-to-gap alignment difficulties as discussed with reference above to the flexible disk embodiment of the present invention.

Signal source and detector 220 includes the necessary signal drivers and detectors to completely analyze the data cartridge drive performance. That is, signal source detector 220 contains write drivers to simulate the 1F and 2F frequencies. It also may contain missing bit, extra bit, and data stream simulators. Signal source and detector 220 also contains read amplifiers and/or signal detection circuitry adapted to measure the writing performance of the data cartridge drive. Further, signal source and detector 220 includes detector circuitry to measure the erase performance of the data cartridge drive. Each of the above circuits within signal source detector 220 is connected individually to either conductor 212, 214, or 216 as appropriate.

Signal source and detector 220 also includes speed measurement and direction sensing electronics to monitor and check the output of tachometer and direction sensor 224. Further, signal source and detector 220 includes the drivers to properly strobe light source 226 to simulate a BOT or EOT condition within the data cartridge drive.

It should be noted that in practicing the present invention, one important aspect is to provide a structure in which the signal conductors (i.e., conductors 44 in embodiment 10; conductor 62 in embodiment 10; conductors 212, 214 and 216 in embodiment 200) are placed into intimate contact with the gap in the magnetic recording head resident within the magnetic recording drive under test when the testing apparatus is inserted therewithin. Various structures could achieve such a result. In one alternative example, the conductors 212, 214, and 216 in the apparatus 200 might be affixed to an elastic band stretched across the opening 208 and anchored to posts on either side of the opening 208. The elastic band would serve the purpose of simulating the tape wrap about the magnetic recording head when the testing fixture of the present invention is inserted within the suitable drive, and thus serves an equivalent function to resilient block 210.

In summary, the test apparatus structures described herein permit complete measurement of magnetic drive recording parameters. These parameters include the writing and reading characteristics of the read/write head, read signal amplitude and resolution characteristics of the read/write channel, detection of missing and/or extra data bits and other recording aspects as well as the auxillary functions of index markers, rotational speed, etc. The use of a microprocessor within the signal source and detectors 48 and 220 additionally expands the enormous applicability of the present invention for automated testing and complete functional analysis.

While for the sake of clarity, and in order to disclose the invention so that the same can be readily understood, a specific embodiment has been described and illustrated, it is to be understood that the present invention is not limited to the specific means disclosed. It may be embodied in other ways that will suggest themselves to persons skilled in the art. It is believed that this invention is new and that all such changes that come within the scope of the following claims are to be considered as part of this invention.

What is claimed is:

1. A test apparatus for testing a plurality of functions of a read/write head of a flexible disk drive of a disk magnetic storage system, the apparatus comprising:
   a housing means fabricated of a rigid material and having dimensions congruent to an outer jacket of a flexible disk assembly, the housing means including a central aperture for a spindle of a disk drive, and further including an oblong read aperture radially arrayed about a first edge of the housing and a circular index sensing aperture positioned near to said oblong read/write aperture;

an electrical conductor affixed to the housing means and centrally arrayed about a long axis of said oblong read aperture, the conductor being positioned to be in close proximity to a read/write head within the disk drive when the housing means is inserted within the disk drive;

signal generating means positioned remotely to the housing means and electrically connected by a conductive cable to the conductor for supplying electrical signals within the recording frequency range of between 120 kilohertz and 250 kilohertz, whereby a plurality of electrical parameters of the read/write head may be tested when the housing means is inserted within the disk drive, the signal generating means further including means for generating strobing signals; and motion simulation means for actuating said read/write head whereby said read/write head will receive signals from the conductor, the motion simulation means including a first light source mounted on the housing means about said index sensing aperture and coupled to the signal generating means, said light source being strobed in accordance with said strobing signals to actuate a light receptive disk drive sensor to simulate rotation of a flexible magnetic disk inserted within said drive, whereby said disk drive is enabled.

2. The test apparatus of claim 1, further comprising:

signal detection means positioned remotely to the housing means and electrically coupled through said conductive cable to said conductor, the signal detector means being adapted to detect and measure a signal output of said read/write head of said magnetic recording drive device.

3. The test apparatus of claim 1, wherein, the conductor is a planar ribbon conductor.

4. The test apparatus of claim 1 further comprising;

a second light source attached to the housing means and positioned to excite a light receptor located within said flexible disk drive when the housing means is inserted therewithin whereby said second light source prevents said flexible disk drive from performing a write function.

5. A test apparatus for testing a plurality of functions of a read/write head of a magnetic data cartridge drive of a cartridge magnetic data storage system, the apparatus comprising:

a housing means fabricated of a rigid material and congruent in shape and dimensions to a magnetic data cartridge;

an electrical conductor, affixed to the housing means and positioned to be in close proximity to said read/write head when the housing means is inserted within said magnetic cartridge drive;

signal generating means positioned remotely to the housing means and electrically connected by a conductive cable to the conductor for supplying electrical signals within the recording frequency range of between 125 and 250 kilohertz whereby a plurality of electrical parameters of said magnetic read/write head may be tested when the housing means is inserted within said magnetic drive device; and motion simulation means for actuating said read/write head whereby said head will receive signals from said conductor, the motion simulation means including a light source positioned within said housing means and adapted to illuminate a light receptive motion detection element within said magnetic data cartridge drive so as to simulate an end-of-tape and a beginning-of-tape condition within said magnetic data cartridge drive when said housing is inserted therewithin.

6. The test apparatus of claim 5, further comprising:

a rotatable hub located within the housing means and positioned to engage and be driven by a capstan within said magnetic data cartridge drive when said cartridge is fully inserted therein, and;

measuring means for measuring the rotational rate of said hub, the measuring means located within the housing.

7. The test apparatus of claim 5, wherein said conductor comprises a plurality of conductive elements affixed to a resilient backing, said plurality of conductive elements being positioned about the housing means to be in close proximity to said read/write head when said magnetic data cartridge is inserted into said magnetic data cartridge drive.

* * * * *